United States Patent
Bonnet (10) Patent No.: US 7,819,624 B2
(45) Date of Patent: Oct. 26, 2010

(54) SUSPENSION SYSTEM

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 11/459,151

(22) Filed: Jul. 21, 2006

(65) Prior Publication Data
US 2007/0090269 A1    Apr. 26, 2007

(30) Foreign Application Priority Data
Jul. 25, 2005   (EP) ................................ 05016089

(51) Int. Cl.
F03D 11/00    (2006.01)
F16F 1/36     (2006.01)
F16F 15/08    (2006.01)

(52) U.S. Cl. ..................... 415/119; 248/638; 267/140.4

(58) Field of Classification Search .................. 415/4.1, 415/4.2, 4.4, 119, 907; 416/500; 248/632, 248/633, 634, 636, 638; 267/140.4, 140.5, 267/141.1
See application file for complete search history.

(56) References Cited

U.S. PATENT DOCUMENTS

| | | | | |
|---|---|---|---|---|
| 2,661,943 A | * | 12/1953 | Wilbur | 267/2 |
| 2,880,885 A | * | 4/1959 | Willison | 213/45 |
| 3,311,331 A | * | 3/1967 | Steimen | 248/633 |
| 3,899,281 A | * | 8/1975 | Jakobs | 425/432 |
| 4,256,354 A | * | 3/1981 | Peterson | 384/202 |
| 4,291,925 A | * | 9/1981 | Peterson et al. | 384/221 |
| 4,329,117 A | * | 5/1982 | Doman | 416/170 R |
| 4,357,057 A | * | 11/1982 | Peterson et al. | 384/125 |
| 4,406,094 A | | 9/1983 | Hempel et al. | |
| 4,744,539 A | * | 5/1988 | Stimeling | 248/638 |
| 5,487,533 A | * | 1/1996 | Kurita et al. | 267/140.5 |
| 6,382,603 B1 | * | 5/2002 | Monson et al. | 267/80 |
| 6,672,837 B1 | * | 1/2004 | Veldkamp et al. | 416/144 |
| 7,220,104 B2 | * | 5/2007 | Zheng et al. | 416/145 |
| 2003/0164586 A1 | | 9/2003 | Michael et al. | |

FOREIGN PATENT DOCUMENTS

| | | |
|---|---|---|
| DE | 199 30 751 | 7/1999 |
| DE | 102 12 075 | 10/2003 |
| EP | 1 008 747 | 6/2000 |
| EP | 1 384 915 | 1/2004 |
| GB | 745 020 | 2/1956 |
| GB | 1 454 145 | 9/1976 |

* cited by examiner

*Primary Examiner*—Nathaniel Wiehe
(74) *Attorney, Agent, or Firm*—Global Patent Operation; Douglas D. Zhang (57) ABSTRACT

A suspension system for suspending an apparatus is disclosed. The suspension system includes at least one suspension element mountable between the apparatus and a support. The at least one suspension element includes a laminate material having at least one metal layer and at least one elastomer layer laminated thereon.

10 Claims, 4 Drawing Sheets

SUSPENSION SYSTEM

FIELD OF THE INVENTION

The present invention relates to a suspension system and to a wind turbine comprising the suspension system.

BACKGROUND OF THE INVENTION

Noise emission from technical installations, particularly power systems, is a safety and environmental concern. Legislation dictates the admissible sound pressure level that a noise source in a certain location may continuously make so that reduced noise emission is a key requirement for low impact environmental integration. Regulations governing these levels vary currently from country to country. In Europe, European Directives 2000-194-EC and 2002-49-EC provide standards. In Germany, the standard values are based on VDI standard 2058, and were adopted by the Technical Directive on Noise Abatement prescribed by law. The maximum allowable values depend on the character of the surroundings and the time of day. For example, 65 dB(A) are allowed in a prevailing industrial surrounding during the day, whereas only 35 dB(A) are allowed in exclusively residential surroundings during the night. These regulations define environmental requirements and acoustical targets for wind turbine installations.

Noise generated by wind turbines is partly mechanical, and partly aerodynamic. Mechanical noise is generated mainly from machinery in the nacelle, particularly the gearbox and the generator, although there may also be contributions from cooling fans, auxiliary equipment (such as pumps and compressors), bearings and the yaw system. Machinery noise is related to high frequency dynamic forces than can generate structure borne or air-borne mechanical noise. Therein, the low frequency noise associated with high forces can be assigned to static and quasi-static loads, e.g. the rotor power torque caused by the wind. Quasi-static structural dynamics being typically below 20 Hz does not relate to noise generation but structural fatigue. High frequency structure-borne mechanical noise, typically in the frequency range of 20-1000 Hz is often associated to dynamic forces related to gear pair meshing mechanical forces from mechanical gear systems or stator-rotor pole meshing electrostatic forces from electrical generator systems. Because dynamic forces from machinery correspond to a discrete force spectrum described by meshing frequencies, the noise spectrum related can also be discrete in nature and result in tonal noise components.

Structure-borne mechanical noise is therefore initiated by dynamic forces from machinery where these dynamic forces are injected by mechanical gear or generator systems at machinery mounting interfaces into the supporting structures or chassis. Transferred dynamic forces through chassis response can then excite structural vibration modes from larger structures such as tower, blades and nacelle enclosure. By coupling with surrounding air, the vibrating surfaces generate sound radiation. Force transfer and noise radiation are especially effective when structural resonances are matching along the transfer chain and when the structural modes wavelength matches the acoustic wavelength in air related to acoustic radiation maxima.

Therefore, damping or isolation of the machinery vibrations are desirable. Another attempt is described in DE 199 30 751 A1 by F. Mitsch filed Jul. 2, 1999, disclosing a method for reducing vibrations of components of a wind turbine. According to said method, a plurality of bearings made of a very soft elastomeric material are used for damping the vibrations. Also, cylindrical elastomeric bushings are used for vibration isolation in existing wind turbines. However, cylindrical elastomer bushings have several disadvantages, namely that they are highly non-linear elements and, therefore, become dynamically hard as steel if high loads are applied. Furthermore, elastomer bushings exhibit poor vibration isolation over the entire frequency range due to their cylindrical shape and their dynamic stiffness increase with frequency. Moreover, the vibration isolation ability of elastomer bushings rapidly decreases with environmental temperature. A further drawback of standard cylindrical elastomer bushings is that they only operate providing low dynamic stiffness and hence some vibration isolation potential along the radial axis direction and allow only very small lateral displacement, thus enabling only very low isolation on the other axis because of typically high radial dynamic stiffness incompatible with vibration isolation.

An additional aspect of vibration isolation is that the machinery support must be able to withstand high loads caused by high wind speeds or wind gusts. Therefore, a conflict exists between vibration isolation requiring very soft mounts to provide vibration isolation for noise control purpose and very hard mounts that can sustain high loads and allow only small displacements of the machinery.

It is therefore an object of the present invention to provide a vibration isolating suspension system that overcomes the above mentioned problems associated with the prior art at least partially. Furthermore, it is an object of the present invention to provide a wind turbine with an improved suspension system.

SUMMARY OF THE INVENTION

This object is achieved by embodiments of a suspension system according to the invention. Further aspects, advantages, features, and details of the present invention are apparent from the following description and the accompanying drawings.

According to a first aspect of the present invention, a suspension system for suspending an apparatus is provided, the suspension system comprising at least one suspension element mountable between the apparatus and a support, wherein said suspension element comprises a laminate material having at least one metal layer and at least one elastomer layer laminated thereon.

A laminated suspension element as described above acts like a spring and shows constant linear dynamic stiffness for either pure compression, pure shear or even a combination thereof. Typically, the suspension element will have a rather flat geometry which further enhances these properties compared to the cylindrical elastomer bushings. Thus, the suspension element provides high vibration isolation at any given load. In contrast to standard elastomer bushings, the dynamic behavior of the above described suspension element can be easily predicted and modeled.

According to an embodiment of the present invention, the suspension element has low dynamic stiffness and low dynamic damping to realize high vibration isolation by dynamically decoupling the apparatus relatively to its supporting structure. Therefore, the suspension element will typically have a dynamic stiffness in the range from about 10 kN/mm up to about 500 kN/mm and a dynamic damping loss in the range from about 1% to about 5%. To make the elastomer layer softer, specific molding patterns like longitudinal or lateral stripes extending through the elastomer layer may be provided. Typically, these specific molding patterns are formed as cavities and may cover up to 50% of the area of the elastomer layer. Typically, the area covered by these molding patterns is in the range from 1% to 50%, typically within 10% to 40% or 15% to 30% of the total area of the elastomer layer. The molding patterns can increase the elastomer expansion or deformation area under compression or shear load.

According to another embodiment of the present invention, the suspension system comprises also at least one displacement limiting element (also called a bump stop) which is mountable to the support and dimensioned to be spaced from the apparatus by a clearance when being mounted to the support, wherein the at least one displacement limiting element comprises a laminate material having at least one metal layer and at least one elastomer layer laminated thereon.

The additional displacement limiting element elements are fixed to the support and are not in contact with the apparatus during normal operation since the vibrational displacement of the apparatus during normal operation is smaller than the clearance. However, when high loads occur, e.g. normal short term high wind gusts or exceptional events like extreme wind gusts, emergency stops, cross-bar events or the like, the displacement limiting elements limit the lateral or vertical displacement of the apparatus. Typically, the displacement limiting elements will therefore have high dynamic stiffness and high dynamic damping to realize both displacement control and energy dissipation during extreme loads. Typically, the displacement limiting elements or displacement limiting elements have a dynamic stiffness in the range from about 100 kN/mm up to about 50000 kN/mm and a dynamic damping loss in the range from about 5% to about 25%. Typically, the stiffness curve of the displacement limiting elements is non-linear.

According to another embodiment of the present invention, the suspension system includes at least two suspension elements, wherein the surface normal of each of the suspension elements is angled at an angle a in a range from $0°≦α≦90°$ with respect to the direction of the main load applied to the apparatus. Typically, an angle in the range from 20° to 70° is selected. By providing the suspension element angled with respect to the direction of the main load, a combination of shear loads and compression loads will be applied to the suspension element.

According to a further embodiment of the present invention, the suspension elements and/or the displacement limiting elements have several sandwiched metal and/or elastomer layers. Typically, the metal layers are individually tailored to a specific frequency whereas the elastomer layers are individually tailored to a specific stiffness curve. In this context, it should be understood that the different metal layers of a single element may be formed of different metals. Likewise, the different elastomer layers of a single element may be formed of different elastomers. Thus, the laminated sandwich elastomer elements can be tailored to a multiple step stiffness curve and several tuning frequencies, e.g. by applying a cascaded mass-spring circuit model. Also, the suspensions elements and/or the displacement limiting elements may be thermally insulated to maintain a specific stiffness.

According to another aspect of the present invention, a wind turbine comprising at least one of the afore-mentioned suspension systems is provided. Typically, the wind turbine machinery suspended by the suspension system is a blade bearing, an inner nacelle frame, a tower bearing, a gear box, a generator, or a shaft bearing. However, every other machinery may be suspended with a suspension system as described above.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
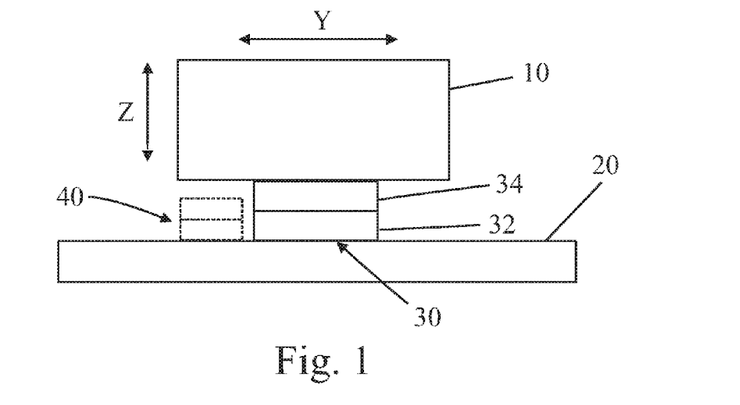
FIG. 1 is a schematic view of a suspension system according to an embodiment of the present invention.

FIG. 1 is a schematic view of a suspension system according to an embodiment of the present invention. Therein, a suspension element 30 is mounted between an apparatus 10 and a support 20. The apparatus 10 vibrates, i.e. is displaced, in Z- as well as in Y-direction as indicated by the arrows. The suspension element 30 dynamically decouples the apparatus 10 from the support 20 so that the vibrations of the apparatus are not or only to a small degree transferred to support 20. For this purpose, suspension element 30 is formed as a laminate material comprising a metal layer 32 and an elastomer layer 34. Typically, the elastomer layer comprises at least one of the following materials: natural rubber, acrylic rubber, butadiene rubber, butyl rubber, chloroprene, chlorinated polyethylene, ethylene-propylene-diene, fluorosilicone rubber, fluorocarbon rubber, nitrile rubber, polyethylen, polyvinyl chloride, polymethyl methacrylate, polybutabiene, polypropylene, polyisobutylene, polyurethane, polyvinyl acetate, polyisoprene, styrene butadiene, silicone rubber, urethane rubber. The suspension element 30 is essentially flat, i.e. its thickness, which is typically in the range between 10 mm to 500 mm, is considerably smaller than its lateral extensions and has low dynamic stiffness and low dynamic damping to realize high vibration isolation by dynamically decoupling the apparatus 10 relatively to its supporting structure. Therefore, the suspension element will typically have a dynamic stiffness in the range from about 10 kN/mm up to about 500 kN/mm and a dynamic damping loss in the range from about 1% to about 5%. As is apparent from FIG. 1, displacements of apparatus 10 in the Z-direction act as compressions/decompressions onto suspension element 30 whereas displacements of apparatus 10 in the Y-direction act as shear onto suspension element 30. Due to its specific structure, suspension element 30 exhibits a linear dynamic stiffness over a large range of loads.

As an optional feature, a displacement limiting element 40 is shown in broken lines in FIG. 1. This displacement limiting element 40 has a structure similar to the suspension element 30, i.e. the displacement limiting element comprises also at least one metal layer and at least one elastomer layer. However, additional displacement limiting element 40 is fixed to the support but is not in contact with the apparatus during normal operation. Particularly, a clearance exists between displacement limiting element 40 and apparatus 10. The size of the clearance is such that the vibrational displacement of the apparatus 10 during normal operation is smaller than the clearance so that the apparatus does not contact displacement limiting element 40 during normal operation. However, when high loads occur, e.g. during emergency stops, cross-bar events or extreme wind gusts, displacement limiting element 40 effectively limits the vertical displacement of apparatus 10. Typically, the displacement limiting element will therefore have high dynamic stiffness and high dynamic damping to realize both displacement control and energy dissipation during extreme loads. Typically, displacement limiting element 40 has a dynamic stiffness in the range from about 100 kN/mm up to about 50000 kN/mm and a dynamic damping loss in the range from about 5% to about 25%. Typically, the stiffness curve of the displacement limiting element is non-linear. Of course, also further displacement limiting elements could be provided, e.g. for limiting the lateral movement of apparatus 10 in the Y-direction.

Figure 2:
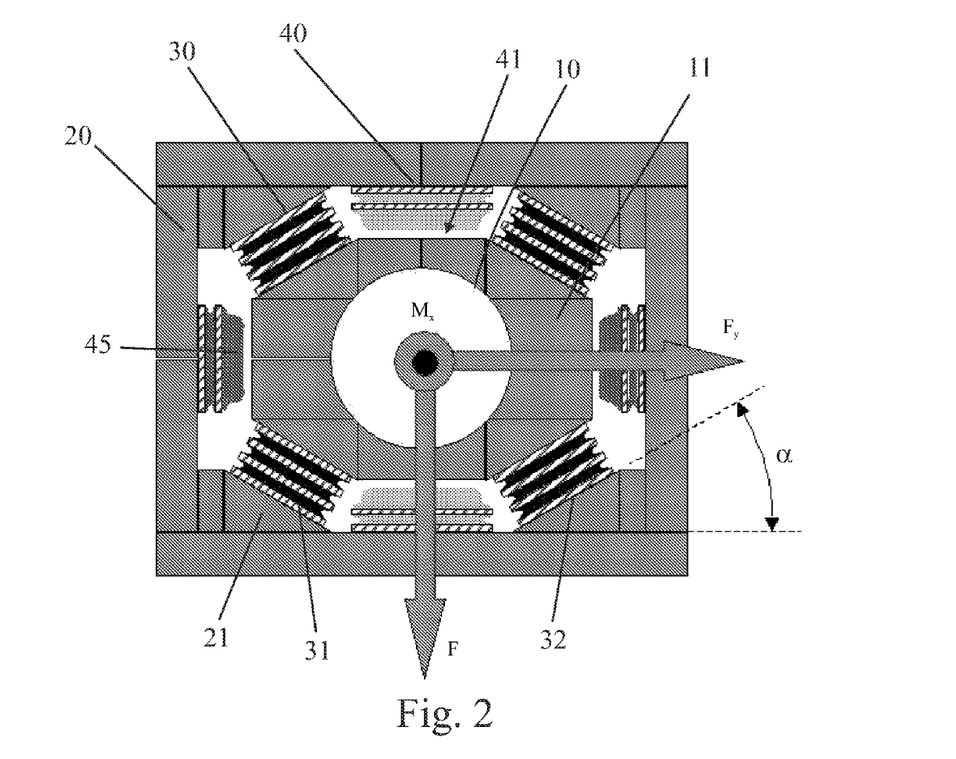
FIG. 2 is a cross-sectional view of a suspension system according to another embodiment of the present invention.

FIG. 2 is a cross-sectional view of a suspension system according to another embodiment of the present invention. Therein, a rotating shaft 10 is supported in a steel bearing 11. The rotating shaft 11 may be connected to a rotor of a wind turbine. The bearing 11 is suspended by four suspension elements 30 mounted between the bearing 11 and a support formed by a steel frame 20, 21. Furthermore, displacement limiting elements 40, 45 are mounted to steel frame 20 between each of the suspension elements. A clearance 41 exists between each of the displacement limiting elements 40, 45 and the bearing 11. The size of clearance 41 is such that bearing 11 will not contact any of displacement limiting elements 40, 45 during normal operation.

As shown in FIG. 2, shaft 10 applies a torque $M_x$ as well as vertical loads $F_z$ and lateral loads $F_y$ onto bearing 11. Due to these operational forces, shaft 10 and bearing 11 are displaced by vibrational motion. Since suspension elements 30 dynamically decouple shaft 10 and bearing 11 from steel frame 20, the vibrations of shaft 10 and bearing 11 are not transferred to frame 20. Thus, noise emission from outer steel frame 20 is effectively suppressed.

In the arrangement shown in FIG. 2, the suspension elements are angled about an angle a with respect to the main load directions as will be explained in the following with reference to suspension elements 31 and 32. Bearing 11 has an octagonal shape with faces being normal to the main load directions and tapered faces in between. Steel frame 20 has a rectangular cross section with the faces of the rectangle being normal to the main load directions. However, tapered abutments 21 are disposed on steel frame 20, the tapered faces of the abutments 21 being parallel to the tapered faces of the bearing 11. Suspension elements 31 and 32, which are only exemplarily selected, are mounted between abutments 21 and the tapered faces of bearing 11. Thus, suspension elements 31, 32 are angled with respect to the main load directions $F_z$ and $F_y$. Typically, the angle a between the suspension elements and the main load directions is in the range from $0° \leq \alpha \leq 90°$ or in the range from $20° \leq \alpha \leq 70°$. Due to this angled arrangement, the suspension elements absorb the horizontal and vertical loads by both compression and shear. Of course, the above is also true for the other suspension elements in FIG. 2. Due to the crossed arrangement of the suspension elements and due to their spring like characteristics, the arrangement shown in FIG. 2 is a self-centering system forcing shaft 10 back to its original position. It should be understood that, of course, suspension elements can also be provided in the X-direction, thus making the system of FIG. 2 a 3-axis suspension system. However, the system can also be configured as a 1-axis suspension system by setting the angle $\alpha=0°$ degrees.

In FIG. 2, the arrows indicate that the vertical loads $F_z$, e.g. resulting from a teetering motion of the wind turbine rotor, are larger than the lateral loads $F_y$, e.g. resulting from a yaw motion of the wind turbine rotor. Therefore, the angle a of abutments 21 is not 45° but smaller so that the suspension elements are more horizontally positioned. Thus, the suspension elements react more compressively in the high load Z-direction and more shear-like in the Y-direction. Furthermore, the displacement limiting elements 40 in the high load Z-direction are different to the displacement limiting elements 45 in the Y-direction. Displacement limiting elements 40 in the high load Z-direction are designed to withstand higher loads than displacement limiting elements 45 in the Y-direction. Additionally or alternatively, the clearance 41 between displacement limiting elements 40 and bearing 11 may be larger than between displacement limiting elements 45 and bearing 11.

Figure 3A:
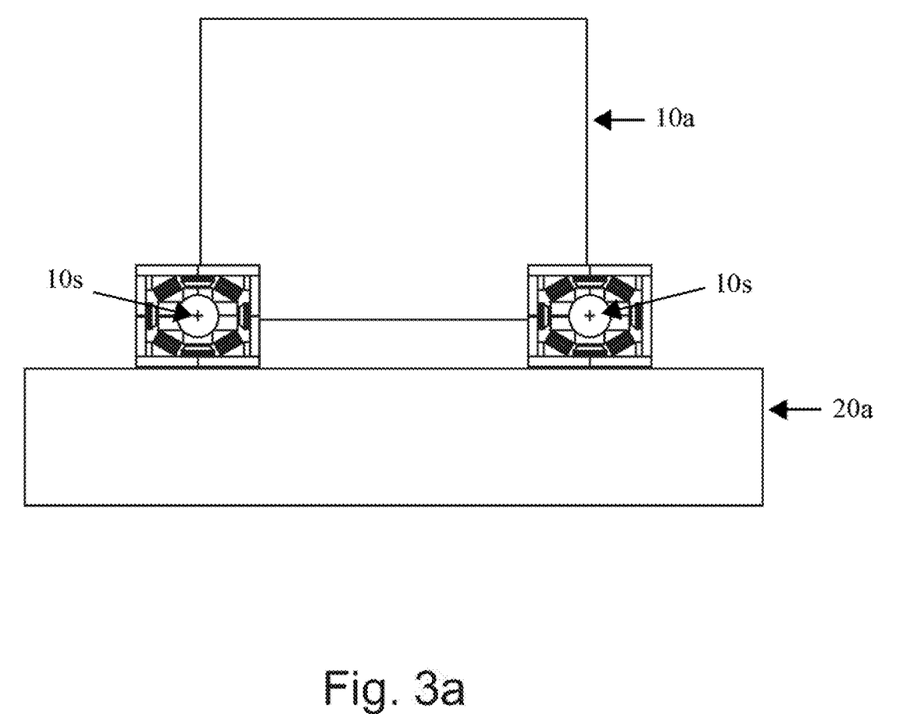
FIGS. 3a and 3b show cross-sectional views of further embodiments of the present invention.
Figure 3B:
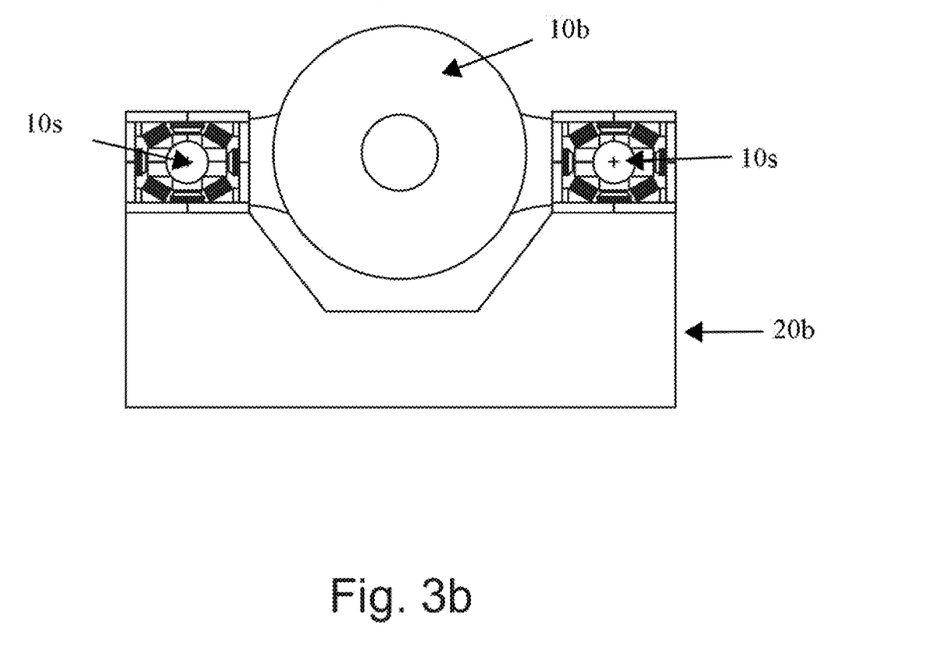

FIGS. 3a and 3b show cross-sectional views of other embodiments of the present invention. Therein, two suspension systems are shown which have a similar structure to the suspension system shown in FIG. 2 are provided. These suspension systems are mounted on a structure or support 20a, 20b. The machinery 10a, 10b has shafts which extend into the suspension systems and, thus, the machinery is suspended. In both cases, the machinery has larger dimensions than the suspension systems. According to the embodiment shown in FIG. 3a, the machinery 10a is suspended on its bottom side whereas, according to the embodiment shown in FIG. 3b, the machinery 10b can be suspended on its horizontal axis since the structure 20b has a recess in which the machinery 10b can extend. Although only two suspension systems are shown in the cross-sectional views of FIGS. 3a and 3b, it should be understood that also four suspension systems can be used in these embodiments. As is apparent from FIGS. 3a and 3b, the suspension systems are disposed in front of the machinery. Likewise, two more suspension systems may be disposed in a similar manner behind the machinery. Thus, symmetry and redundancy of the arrangement is improved and the individual suspension systems may have smaller dimensions.

Figure 4A:
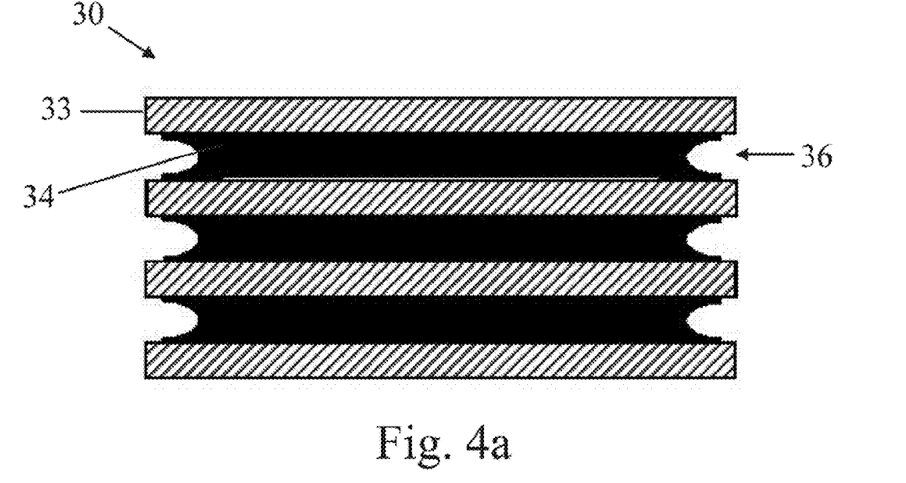
FIGS. 4a and 4b show suspension elements according to embodiments of the present invention.

Next, a suspension element 30 is explained in detail with reference to FIGS. 4a and 4b. FIG. 4a shows a cross sectional view of a first embodiment of a suspension element 30. Suspension element 30 has a flat laminate sandwich structure with several metal layers 33 and elastomer layers 34 sandwiched there between. Each of the elastomer layers 34 has a recess 36 at its outer edge. When elastomer layer 34 is compressed during operation, the bulk elastomer can extend into that recess. Thus, the risk of damage of the elastomer layer surface is reduced and the fatigue strength of the suspension element 30 is improved.

Figure 4B:
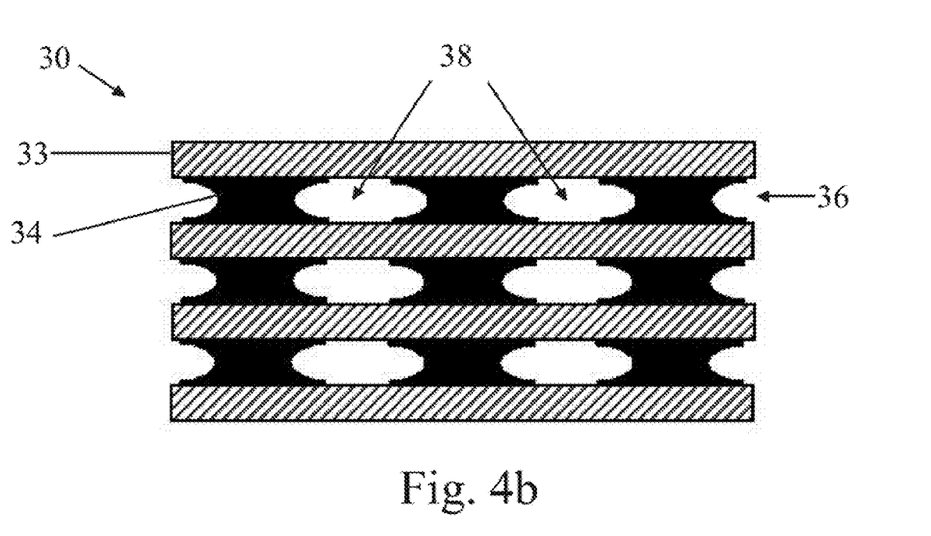

A cross sectional view of another embodiment of a suspension element 30 is shown in FIG. 4b. Although the basic design is similar to the embodiment shown in FIG. 4a, the suspension element 30 shown in FIG. 4b comprises several cavities 38 within elastomer layers 34. The size and distribution of cavities 38 may be adapted, e.g. by computer modeling of the dynamic behavior of elastomer layer 34. It should be understood that the elastomer layer becomes the softer the more area of it is occupied with cavities 38. Thus, the fraction of cavities within an elastomer layer 34 can be used to shape the stiffness curve of that layer and, accordingly, of the suspension element. The cavities may cover up to 50% of the area of the elastomer layer. Typically, the area covered by these cavities is in the range from 1% to 50%, typically within 10% to 40% or 15% to 30% of the total area of the elastomer layer 34.

A further feature of a suspension element can be seen in FIG. 4b. The cross sectional view shows that the elastomer material is recessed along the edges of cavities 38. Thus, the elastomer material can extend into these recesses when the elastomer layer 34 is compressed. Also, the volume of the elastomer is further reduced and, thus, elastomer layer 34 further softened.

Figures 5A, 5B:
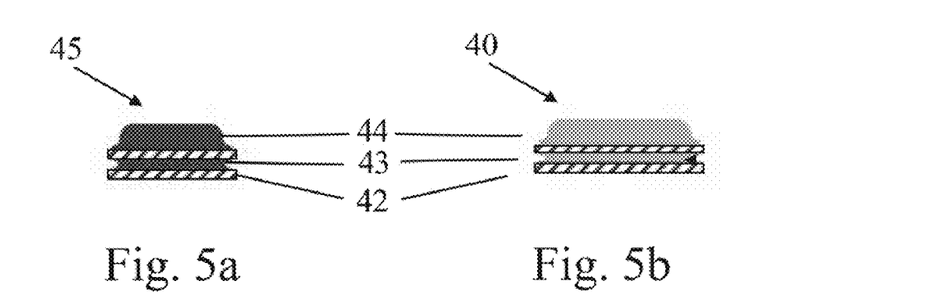
FIGS. 5a and 5b show displacement limiting elements according to embodiments of the present invention.

FIGS. 5a and 5b show displacement limiting elements, i.e. displacement limiting elements, according to embodiments of the present invention. Their principal structure is very similar to the structure of a suspension element, i.e. displacement limiting elements are also laminates from metal layers 42 and elastomer layers 43, 44 and the elastomer layer 43 or 44 typically comprises at least one of the following materials: natural rubber, acrylic rubber, butadiene rubber, butyl rubber, chloroprene, chlorinated polyethylene, ethylene-propylene-diene, fluorosilicone rubber, fluorocarbon rubber, nitrile rubber, polyethylen, polyvinyl chloride, polymethyl methacrylate, polybutabiene, polypropylene, polyisobutylene, polyurethane, polyvinyl acetate, polyisoprene, styrene butadiene, silicone rubber, urethane rubber.

However, displacement limiting elements differ from suspension elements in that they have high dynamic stiffness and high dynamic damping to realize both displacement control and energy dissipation during extreme loads. Typically, the displacement limiting elements have a dynamic stiffness in the range from about 100 kN/mm up to about 50000 kN/mm and a dynamic damping loss in the range from about 5% to about 25%. Typically, the stiffness curve of the displacement limiting elements is non-linear. Furthermore, different types of displacement limiting elements may be provided, e.g. softer displacement limiting elements 45 disposed in directions of relatively low forces and harder displacement limiting elements 40 disposed in directions of high loads. Like the suspension elements, the dynamic stiffness curves of the displacement limiting elements can be individually shaped for each application. Furthermore, displacement limiting elements may have a very thick elastomer layer for contacting the suspended apparatus.

Figure 6:
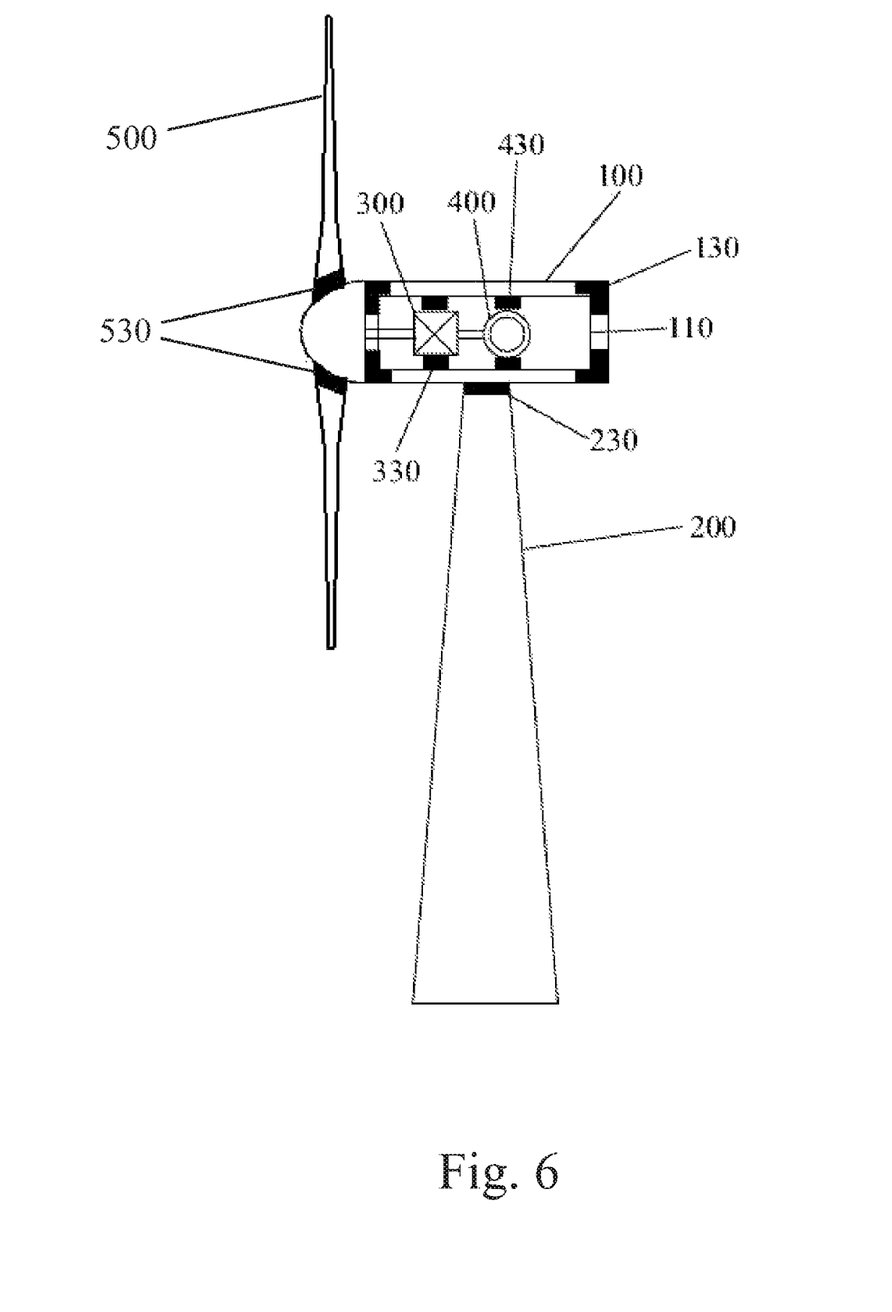
FIG. 6 is a schematic view of a wind turbine equipped with suspension elements according to embodiments of the present invention.

Finally, possible applications of the suspension system to a wind turbine are shown in FIG. 6. Therein, the nacelle of the wind turbine comprises an outer steel frame 100 and an inner steel frame 110 which houses a gear box 300 and a generator 400. The outer steel frame 100 is mounted on top of a tower 200. Furthermore, the wind turbine has rotor blades 500 mounted to a hub. Suspension elements 130 are mounted between the inner corners of outer frame 100 and the outer corners of inner frame 110 so that inner frame 110 is completely dynamically insulated from outer frame 100. Thus, vibrations of inner frame 110 are not transferred to outer frame 100. Furthermore, gear box 300 is suspended by suspension elements 330 inside inner frame 110 as well as generator 400 is suspended by suspension elements 430 inside inner frame 110. Thus, gear box 300 and generator 400 are decoupled from inner frame 110. Likewise, the bearing of the nacelle is suspended on suspension elements 230 disposed at the top of steel tower 200 so that vibrations of the nacelle, i.e. vibrations of outer frame 100 in this case, are not transferred to steel tower 200. Finally, also rotor blades 500 are suspended by suspension elements 530 to isolate them from the hub. Due to these measures, the noise, particularly the audible noise, emitted from the wind turbine is considerably reduced. It should further be understood that, of course, displacement limiting elements can also be provided for inner frame 110, gear box 300 and/or generator 400.

Having thus described the invention in detail, it should be apparent for a person skilled in the art that various modifications can be made in the present invention without departing from the spirit and scope of the following claims. For example, it should be clear that, although described with respect to a wind turbine, the above described suspension system can be used for suspending any vibrating or moving machinery, e.g. on ships, aircraft or land transportation means. Furthermore, the suspension elements and/or the displacement limiting elements may be provided with thermal insulation to maintain a relatively constant operational temperature. Thus, the specific stiffness properties of the elastomer can be maintained during operation.

The invention claimed is:

1. A suspension system for suspending an apparatus, comprising:
   at least one suspension element mountable between the apparatus and a support, wherein the at least one suspension element comprises a laminate material having at least one metal layer and at least one elastomer layer laminated thereon, the at least one suspension element having a dynamic stiffness in a range from about 10 kN/mm to about 500 kN/mm and a dynamic damping loss in a range from about 1% to about 5%; and
   at least one displacement limiting element mountable to the support and dimensioned to be spaced from the apparatus by a clearance when mounted to the support, wherein the at least one displacement limiting element comprises a laminate material having at least one metal layer and at least one elastomer layer laminated thereon, the at least one displacement limiting element having a dynamic stiffness in a range from about 100 kN/mm to about 50000 kN/mm and a dynamic damping loss in a range from about 5% to about 25%;
   wherein the at least one displacement limiting element is mountable to the support such that compression of the at least one suspension element in a direction perpendicular to a plane of the laminate material of the at least one suspension element beyond a predetermined threshold causes the apparatus to engage the at least one displacement limiting element.

2. The suspension system according to claim 1, wherein the at least one elastomer layer of the at least one suspension element or the at least one displacement limiting element comprises at least one cavity.

3. The suspension system according to claim 2, wherein up to about 50% of the area of the at least one elastomer layer is covered by at least one cavity.

4. The suspension system according to claim 1, wherein at least one of the at least one elastomer layer of the at least one suspension element and the at least one elastomer layer of the at least one displacement limiting element comprises a recess at an outer edge thereof.

5. The suspension system according to claim 1, wherein at least one of the at least one suspension element and the at least one displacement limiting element comprises a plurality of laminated metal and elastomer layers.

6. The suspension system according to claim 1, wherein at least one of the at least one elastomer layer of the at least one suspension element and the at least one elastomer layer of the at least one displacement limiting element is comprised of at least one of the following materials: natural rubber, acrylic rubber, butadiene rubber, butyl rubber, chloroprene, chlorinated polyethylene, ethylene- propylene-diene, fluorosilicone rubber, fluorocarbon rubber, nitrile rubber, polyethylen, polyvinyl chloride, polymethyl methacrylate, polybutabiene, polypropylene, polyisobutylene, polyurethane, polyvinyl acetate, polyisoprene, styrene butadiene, silicone rubber, urethane rubber.

7. The suspension system according to claim 1, wherein the at least one suspension element comprises at least two suspension elements, wherein a surface normal of each of the at least two suspension elements is angled in a range from about 0° to about 90° with respect to a direction of a main load ($F_z$) applied to the apparatus.

8. The suspension system according to claim 1, wherein at least one of the at least one suspension element and the at least one displacement limiting element has a thermal insulation.

9. A wind turbine comprising at least one suspension system according to claim 1.

10. The wind turbine according to claim 9, wherein the apparatus suspended by the at least one suspension system is a blade bearing, an inner nacelle frame, a tower bearing, a gear box, a generator, or a shaft bearing.

* * * * *

UNITED STATES PATENT AND TRADEMARK OFFICE
CERTIFICATE OF CORRECTION

| | | |
|---|---|---|
| PATENT NO. | : 7,819,624 B2 | |
| APPLICATION NO. | : 11/459151 | |
| DATED | : October 26, 2010 | |
| INVENTOR(S) | : Bonnet | |

It is certified that error appears in the above-identified patent and that said Letters Patent is hereby corrected as shown below:

The title page showing the illustrative figure should be deleted to be replaced with the attached title page.

The drawing sheet, consisting of Fig. 2, should be deleted to be replaced with the drawing sheet, consisting of Fig. 2, as shown on the attached page.

In Column 4, Line 51, delete "polyethylen," and insert -- polyethylene, --, therefor.

In Column 4, Line 52, delete "polybutabiene," and insert -- polybutadiene, --, therefor.

In Column 5, Line 66, delete "a" and insert -- $\alpha$ --, therefor.

In Column 6, Line 13, delete "$\alpha$=0° degrees." and insert -- $\alpha$=0°. --, therefor.

In Column 6, Line 36, after "shafts" insert -- 10s --, therefor.

In Column 7, Line 30, delete "polyethylen," and insert -- polyethylene, --, therefor.

In Column 7, Line 31, delete "polybutabiene," and insert -- polybutadiene, --, therefor.

In Column 7, Line 59, delete "comers" and insert -- corners --, therefor.

In Column 7, Line 60, delete "comers" and insert -- corners --, therefor.

In Column 9, Line 8, in Claim 6, delete "polyethylen," and insert -- polyethylene, --, therefor.

In Column 9, Line 9, in Claim 6, delete "polybutabiene," and insert -- polybutadiene, --, therefor.

Signed and Sealed this
Twelfth Day of April, 2011

David J. Kappos
*Director of the United States Patent and Trademark Office*

(12) United States Patent
Bonnet (10) Patent No.: US 7,819,624 B2
(45) Date of Patent: Oct. 26, 2010

(54) SUSPENSION SYSTEM

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 11/459,151

(22) Filed: Jul. 21, 2006

(65) Prior Publication Data
US 2007/0090269 A1    Apr. 26, 2007

(30) Foreign Application Priority Data
Jul. 25, 2005    (EP)    ............................ 05016089

(51) Int. Cl.
F03D 11/00    (2006.01)
F16F 1/36    (2006.01)
F16F 15/08    (2006.01)

(52) U.S. Cl. ............... 415/119; 248/638; 267/140.4

(58) Field of Classification Search ............... 415/4.1, 415/4.2, 4.4, 119, 907; 416/500; 248/632, 248/633, 634, 636, 638; 267/140.4, 140.5, 267/141.1
See application file for complete search history.

(56) References Cited

U.S. PATENT DOCUMENTS

| | | | |
|---|---|---|---|
| 2,661,943 A * | 12/1953 | Wilbur | 267/2 |
| 2,880,885 A * | 4/1959 | Willison | 213/45 |
| 3,311,331 A * | 3/1967 | Steimen | 248/633 |
| 3,899,281 A * | 8/1975 | Jakobs | 425/432 |
| 4,256,354 A * | 3/1981 | Peterson | 384/202 |
| 4,291,925 A * | 9/1981 | Peterson et al. | 384/221 |
| 4,329,117 A * | 5/1982 | Doman | 416/170 R |
| 4,357,057 A * | 11/1982 | Peterson et al. | 384/125 |
| 4,406,094 A | 9/1983 | Hempel et al. | |
| 4,744,539 A * | 5/1988 | Stimeling | 248/638 |
| 5,487,533 A * | 1/1996 | Kurita et al. | 267/140.5 |
| 6,382,603 B1 * | 5/2002 | Monson et al. | 267/80 |
| 6,672,837 B1 * | 1/2004 | Veldkamp et al. | 416/144 |
| 7,220,104 B2 * | 5/2007 | Zheng et al. | 416/145 |
| 2003/0164586 A1 | 9/2003 | Michael et al. | |

FOREIGN PATENT DOCUMENTS

| | | |
|---|---|---|
| DE | 199 30 751 | 7/1999 |
| DE | 102 12 075 | 10/2003 |
| EP | 1 008 747 | 6/2000 |
| EP | 1 384 915 | 1/2004 |
| GB | 745 020 | 2/1956 |
| GB | 1 454 145 | 9/1976 |

* cited by examiner

*Primary Examiner*—Nathaniel Wiehe
(74) *Attorney, Agent, or Firm*—Global Patent Operation; Douglas D. Zhang (57) ABSTRACT

A suspension system for suspending an apparatus is disclosed. The suspension system includes at least one suspension element mountable between the apparatus and a support. The at least one suspension element includes a laminate material having at least one metal layer and at least one elastomer layer laminated thereon.

10 Claims, 4 Drawing Sheets

Fig. 1

Fig. 2